No. 713,710. Patented Nov. 18, 1902.
L. STEIN & W. STORR.
PROCESS OF MANUFACTURING GLASS OR PORCELAIN PLATES OR SLABS.
(Application filed Apr. 17, 1901.)
(No Model.)
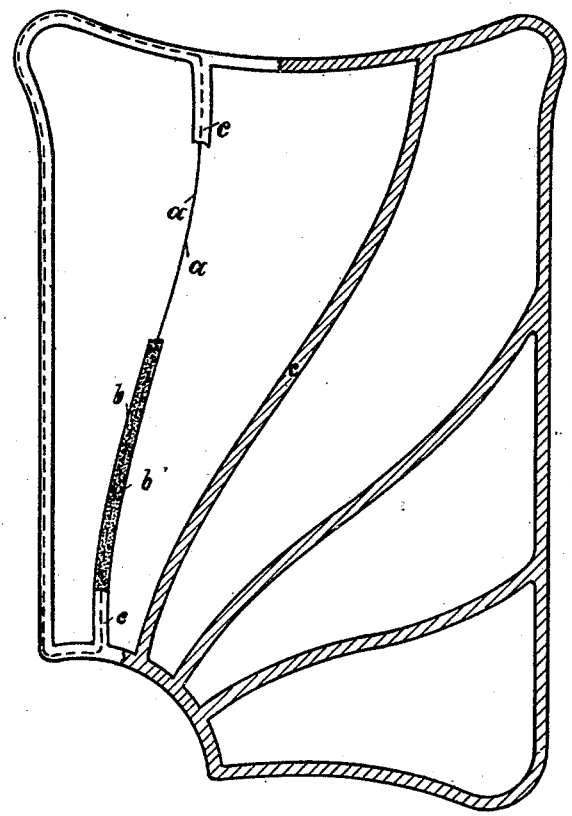

UNITED STATES PATENT OFFICE.

LEO STEIN AND WILHELM STORR, OF BERLIN, GERMANY.

PROCESS OF MANUFACTURING GLASS OR PORCELAIN PLATES OR SLABS.

SPECIFICATION forming part of Letters Patent No. 713,710, dated November 18, 1902.

Application filed April 17, 1901. Serial No. 56,263. (No specimens.)

*To all whom it may concern:*

Be it known that we, LEO STEIN, a subject of the Grand Duke of Baden, and WILHELM STORR, a subject of the King of Würtemberg, both manufacturers and both at present residing at 93 Alexandrinenstrasse, in the city of Berlin, in the German Empire, have invented a certain new and useful Process of Manufacturing Glass or Porcelain Plates or Slabs in Pieces and of Great Durability, of which the following is a specification.

This invention has reference to a process for securely and durably uniting the several parts of fancy glasswork or of enameled work and for covering the joints with any kind of metal, silver, copper, or the like. By the application of this process the durabilty and the appearance of the product are greatly enhanced and it is possible to obtain a metal covering of any desired thickness. The process applies as well to joining pieces of porcelain or other poor conductors together. For effecting the union we employ a mixture of substances of sufficient fusibility to melt when heated in a muffle and of good conductivity. This mixture is used as a cement for joining the pieces of glass, porcelain, or the like bad conductors of electricity together, those parts which have been treated with the mixture in this manner affording a passage to electricity after being heated in a muffle. The conducting-base thus produced may then be used for depositing thereon a coating of metal by electrolysis.

As an instance for the composition of a cementing mixture, we may with preference make use of the following: about ten parts of flux—borate, for instance—about ten parts of chalk, about thirty parts of any suitable metal oxid, about forty parts of precious metal in powder, about ten parts of soluble glass. We are aware that this mixture is itself old and that it has already been used as a base for an electrolytic deposit of metal when united with glass by fusion. The composition of this mass may be varied, according to the result it is desired to produce, as long as it will fuse by heat to the edges of the pieces of glass or the like to be united and yield a conductor of electricity after solidification, and a base for any subsequent deposition of strips of metal upon the joining edges.

In the accompanying drawing there is illustrated in plan and part section a piece of mosaic or fancy glasswork embodying the invention.

For carrying our process into effect we may proceed as follows: For effecting the union of pieces of non-conducting material—of glass, for instance—the edges $a$ are covered with the above-mentioned mixture $b$, as illustrated in the drawing. The several parts having thus become cemented, the whole piece is heated up to a temperature sufficient to fuse the mixture onto the glass or porcelain and form one solid piece of manufacture. The heated material is then allowed to cool, whereby the several parts will become intimately united with each other to one piece. Any unevenness of surface is then compensated by a suitable filler, and after the conductivity of any ground-off parts has been restored the piece of manufacture thus prepared is then immersed in an electrolytic metal solution, from which the metal $c$ is deposited on all the parts which have been covered with the cementing mixture until the desired thickness of metal is reached. We thus produce a plate or slab of great durability and the several parts of which are securely united to each other, inasmuch as the cementing mixture $b$ is united by fusion with the glass or the like material, while, on the other hand, it is also firmly united and chemically combined with the metal $c$. Thus the metal is cemented to the glass or similar material by the above mixture.

What we claim, and desire to secure by Letters Patent of the United States, is—

The process of manufacturing mosaics and similar kinds of fancy glass and pottery work, which consists in mixing a suitable flux with a good conductor of electricity, applying said mixture to the joining edges of the pieces of material to be united, submitting the product to a temperature sufficient to produce the fusion of the flux and the union of the several pieces of material, and then applying a deposit of metal to the edges of the product with the conducting-flux as a base, substantially as described.

In witness whereof we have hereunto signed our names in the presence of the subscribing witnesses.

LEO STEIN.
WILHELM STORR.

Witnesses as to Leo Stein:
 HENRY HASPER,
 WOLDEMAR HAUPT.

Witnesses as to Wilhelm Storr:
 EDWARD P. MACLEAN,
 GEORGE E. LIGHT.